(12) United States Patent
Pestoni et al.

(10) Patent No.: US 8,789,196 B2
(45) Date of Patent: Jul. 22, 2014

(54) SYSTEM AND METHOD FOR PROVIDING CONTENT PROTECTION OF LINEARLY CONSUMED CONTENT WITH A BIDIRECTIONAL PROTOCOL FOR LICENSE ACQUISITION

(75) Inventors: Florian Pestoni, Mountain View, CA (US); Sunil C. Agrawal, Milpitas, CA (US); Viswanathan Swaminathan, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 412 days.

(21) Appl. No.: 12/790,529

(22) Filed: May 28, 2010

(65) Prior Publication Data

US 2013/0121489 A1    May 16, 2013

(51) Int. Cl.
| | | |
|---|---|---|
| *H04L 29/06* | (2006.01) | |
| *H04N 21/8355* | (2011.01) | |
| *H04L 9/08* | (2006.01) | |
| *H04N 21/845* | (2011.01) | |
| *H04N 21/4627* | (2011.01) | |
| *H04N 21/2347* | (2011.01) | |

(52) U.S. Cl.
CPC .............. *H04L 9/0822* (2013.01); *H04L 63/10* (2013.01); *H04L 63/06* (2013.01); *H04N 21/8355* (2013.01); *H04L 2209/603* (2013.01); *H04N 21/8456* (2013.01); *H04N 21/4627* (2013.01); *H04L 2463/101* (2013.01); *H04N 21/2347* (2013.01)
USPC ............................................. 726/26; 380/210

(58) Field of Classification Search
CPC ............ G06F 21/10; G06F 2221/2107; G06F 2221/0753; H04N 21/2541; H04L 2463/101
USPC ............................................ 380/210; 726/26
See application file for complete search history.

(56) References Cited

U.S. PATENT DOCUMENTS

| | | | | |
|---|---|---|---|---|
| 6,873,975 | B1 * | 3/2005 | Hatakeyama et al. | 705/51 |
| 6,915,425 | B2 * | 7/2005 | Xu et al. | 713/165 |
| 7,050,583 | B2 | 5/2006 | Montgomery | |
| 7,299,209 | B2 * | 11/2007 | Collier | 705/59 |

(Continued)

OTHER PUBLICATIONS

Content Protection for IPTV-current state of the art and challenges; Zhang Hua, Chen Chunxiao, Zhao Li, Yang Shiqiang, Zhou Lizhu; IMACS Multiconference on "Computational Engineering in Systems Applications"(CESA), Oct. 4-6, 2006, Beijing, China.*

(Continued)

*Primary Examiner* — Luu Pham
*Assistant Examiner* — James Turchen
(74) *Attorney, Agent, or Firm* — Wolfe-SBMC

(57) ABSTRACT

Embodiments may include a content provider system configured to provide electronic content that includes multiple encrypted content items to a playback device. A playback device may be configured to acquire root licenses and/or content licenses from a license server; such licenses may cryptographically protect the content items that a playback device receives from a content provider system. In various embodiments, the electronic content may be content that is to be linearly consumed, such as a channel within a broadcast environment. In various embodiments, the playback device may explicitly request a license for one or more of the content items that it receives; such request may be issued to a license server. The license server may evaluate the request and respond to the playback device with the license for a content item. In various embodiments, the playback device may utilize the received license to decrypt and consume the respective content item.

24 Claims, 8 Drawing Sheets

(56) References Cited

U.S. PATENT DOCUMENTS

| | | | |
|---|---|---|---|
| 7,827,113 B2* | 11/2010 | Saeki et al. | 705/59 |
| 8,239,446 B2* | 8/2012 | Navar et al. | 709/203 |
| 2005/0080746 A1* | 4/2005 | Zhu et al. | 705/59 |
| 2005/0251487 A1* | 11/2005 | Evans et al. | 705/59 |
| 2006/0230458 A1* | 10/2006 | Saeki et al. | 726/26 |
| 2006/0239451 A1 | 10/2006 | Evans | |
| 2006/0242078 A1 | 10/2006 | Evans | |
| 2006/0242080 A1 | 10/2006 | Van Dyke | |
| 2007/0160208 A1 | 7/2007 | MacLean | |
| 2007/0162399 A1* | 7/2007 | Medvinsky et al. | 705/59 |
| 2007/0198858 A1* | 8/2007 | Kim et al. | 713/193 |
| 2007/0294170 A1 | 12/2007 | Vantalon | |
| 2008/0019516 A1* | 1/2008 | Fransdonk | 380/201 |
| 2008/0066181 A1* | 3/2008 | Haveson et al. | 726/26 |
| 2009/0157552 A1* | 6/2009 | Schnell et al. | 705/59 |
| 2009/0169002 A1 | 7/2009 | Hauge | |
| 2011/0072268 A1* | 3/2011 | Yamagishi et al. | 713/171 |
| 2011/0164753 A1* | 7/2011 | Dubhashi et al. | 380/282 |
| 2012/0017282 A1* | 1/2012 | Kang et al. | 726/26 |

OTHER PUBLICATIONS

Microsoft PlayReady Content Access Technology; Jul. 2008, White Paper.*

* cited by examiner

SYSTEM AND METHOD FOR PROVIDING CONTENT PROTECTION OF LINEARLY CONSUMED CONTENT WITH A BIDIRECTIONAL PROTOCOL FOR LICENSE ACQUISITION

BACKGROUND

1. Field of the Invention

The present invention is directed to computer systems. More particularly, it is directed to the protection of electronic content within a computing environment.

2. Description of the Related Art

In a general sense, conditional access systems require certain criteria to be met before access to protected content is granted. For example, cable television providers employing conditional access may encrypt television channels such that unencrypted versions of such channels can only be viewed by individuals that have acquired an appropriate subscription. In this example, a television set top box issued to a subscriber may include a decryption module for decrypting content from the provider. In an example including conventional analog systems, this process was historically performed by scrambling television channels; a television set top box capable of descrambling such channels was required to view the channels.

In early conditional access systems, communication between the content provider and the subscriber was unidirectional. For instance, a content channel could be provided as unidirectional downstream content sent from the provider's system to the subscriber device (e.g., a set top box). Within such a framework, the content provider could push non-content information (e.g., decryption keys for channel decryption) in-band over the unidirectional channel to the subscriber.

SUMMARY

Various embodiments of a system and method for providing content protection of linearly consumed content with a bidirectional protocol for license acquisition are described. Embodiments may include one or more content provider systems configured to provide electronic content that includes multiple encrypted content items to one or more playback devices. A playback device may be configured to acquire one or more licenses from one or more license servers; such licenses may cryptographically protect the content items that a playback device receives from a content provider system.

In various embodiments, the electronic content that is provided from the one or more content provider systems to a playback device may be content that is to be linearly consumed (e.g., played), such as consumed according to a playlist that specifies the chronological sequence according to which different content items are to be consumed. In various embodiments, the playback device may explicitly request a content license for each of the content items that it receives; such request may be issued to a license server. The license server may evaluate the request and respond to the playback device with the content license for a content item. This content license may include a decryption key and usage rules that specify one or more restrictions on the access or consumption of the content item. In various embodiments, the playback device may utilize the received content license to decrypt and consume the respective content item. In various embodiments, the above described process may be repeated for each content item that is to be linearly consumed (e.g., according to a playlist or other specified sequence).

By utilizing such bidirectional protocol for license acquisition, embodiments may differ from conventional unidirectional conditional access systems in a number of respects. For instance, in conventional unidirectional conditional access systems, a content provider system may push decryption keys in-band (e.g., as part of a content stream) to a respective playback device. Furthermore, in conventional unidirectional conditional access systems, the content decryption keys for different playback devices (e.g., different subscribers) may all be included within the same content stream; this may be done by encrypting each content decryption key such that only the appropriate playback device can decrypt it. In this conventional system, it may be left up to each individual playback device to hold the correct key that will decrypt the appropriate content decryption key for that playback device among the multiple other decryption keys in the content stream.

Figure 1:
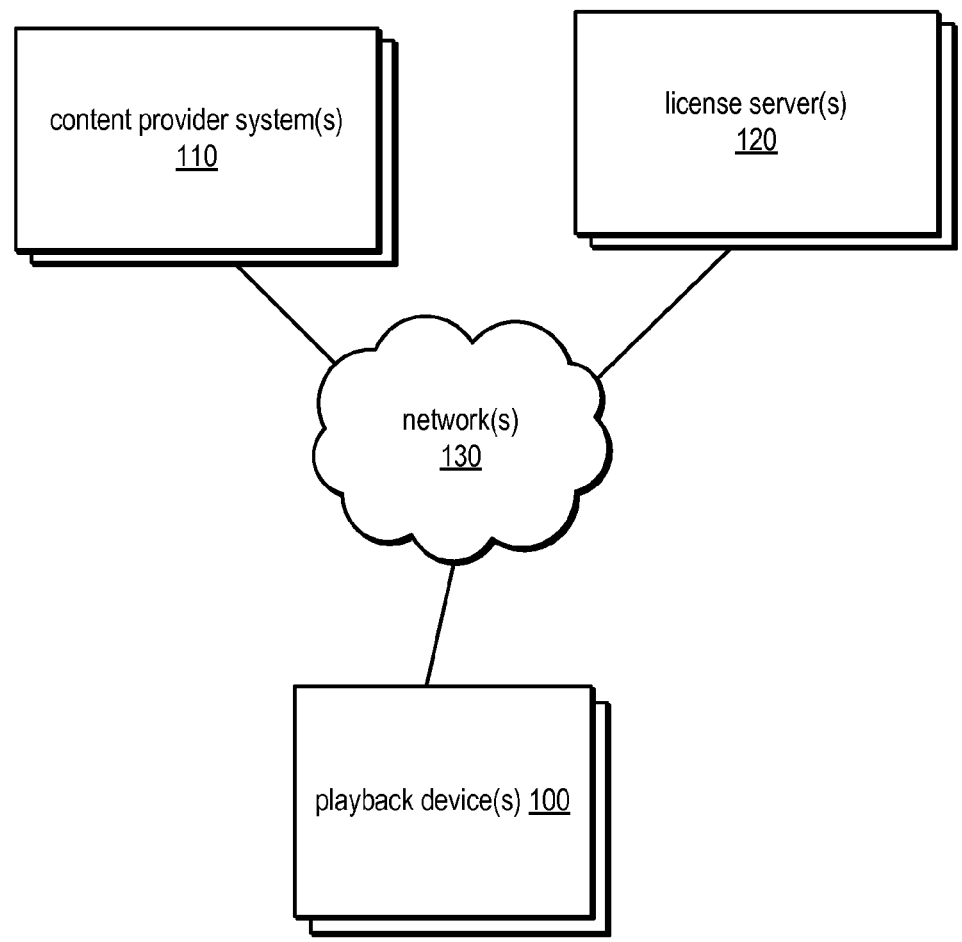
FIG. 1 illustrates a block diagram of an example system configuration, according to some embodiments.

While the system and method for providing content protection of linearly consumed content with a bidirectional protocol for license acquisition is described herein by way of example for several embodiments and illustrative drawings, those skilled in the art will recognize that the system and method for providing content protection of linearly consumed content with a bidirectional protocol for license acquisition is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for providing content protection of linearly consumed content with a bidirectional protocol for license acquisition as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for providing content protection of linearly consumed content with a bidirectional protocol for license acquisition are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments include various encryption and/or decryption keys, any of which may be generated via a key derivation function (KDF). Key derivation functions may include the completion of one or more iterations or instances of cryptographic operations in order to generate an encryption or decryption key. Examples of key derivation function may include but are not limited to any key derivation functions specified by Public Key Cryptography Standards (PKCS) (e.g., PKCS-5 or PKCS-12) or Adobe® Password Security. In various embodiments, KDFs may be utilized by any of the various components described herein to generate encryption keys for symmetric encryption.

In various instances, this detailed description may refer to content items (which may also be referred to as "content data," "content information" or simply "data" or "information"). In some instances, content items may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format, the F4V format, MPEG-4 formats, or some other video file format whether such format is presently known or developed in the future.

In various embodiments, the content items described herein may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 8:
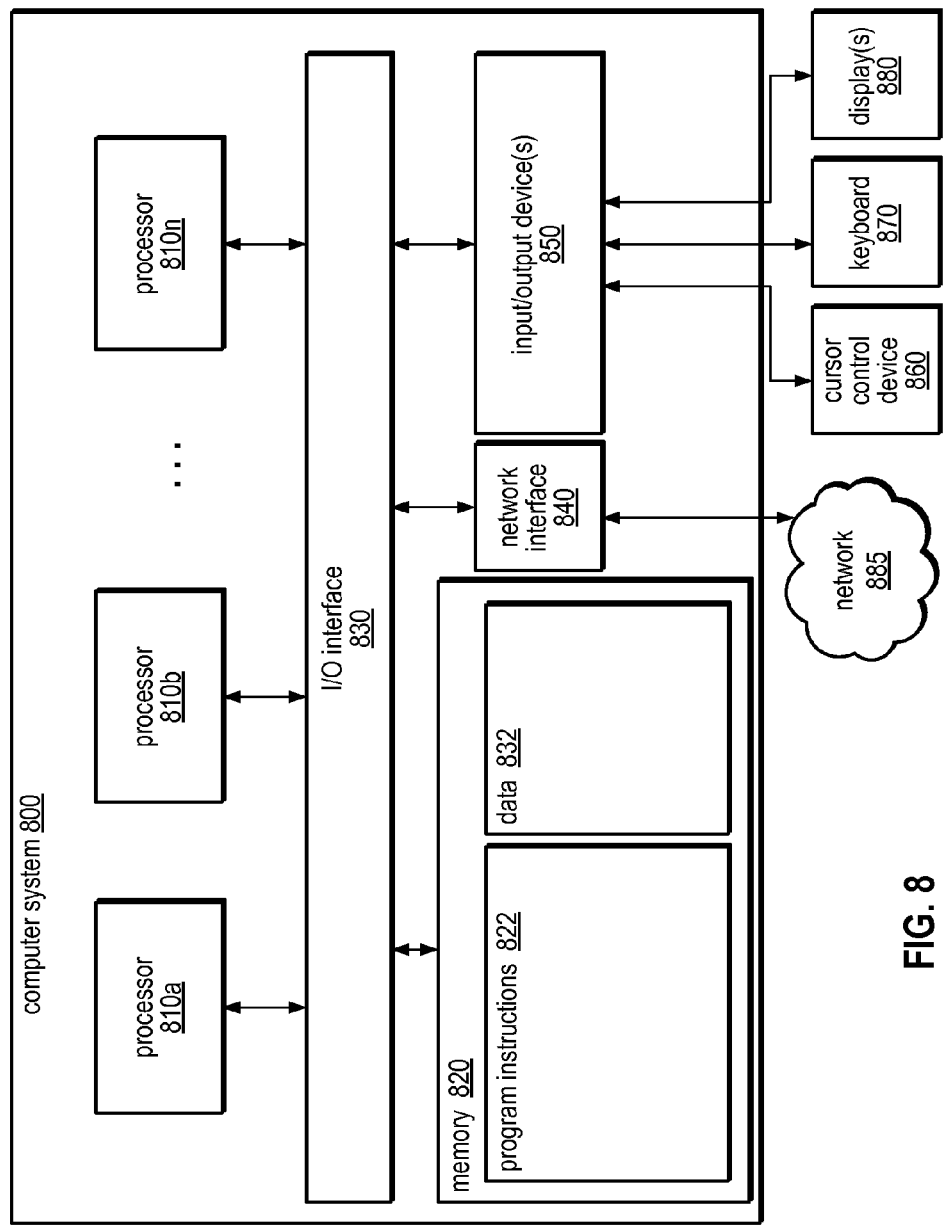
FIG. 8 illustrates an example computer system suitable for implementing various components of the system and method for providing content protection of linearly consumed content with a bidirectional protocol for license acquisition, according to various embodiments.

In various instances, this detailed description may refer to a devices configured to perform content consumption. In various embodiments, such a device may include but is not limited to a computing system (e.g., a desktop or laptop computer), a set-top television box, a digital audio or multimedia player (e.g., an MP3 player), a personal digital assistant (PDA), a mobile phone, a smartphone, a touchscreen phone, an e-book reader, a digital photo frame, or any other device or system configured to access, view, read, write, and/or manipulate any of the content data described herein. Any of such devices may be implemented via a computer system similar to that described with respect to FIG. 8.

Note that in various instances the description presented herein may refer to a given entity performing some action. It should be understood that this language may in some cases mean that a system (e.g., a computer) owned and/or controlled by the given entity is actually performing the action.

Note that in various instances the description presented herein may refer to a public key being associated with a private key or a public key corresponding to private key. It should be understood that such statements may mean that such a public key forms a public key—private key pair with such a private key. Additionally, in some cases, a public key—private key pair may be referred to as simply a "key pair." Note that in various embodiments, public key—private key pairs may be generated via one or more key derivation functions, such as those described above.

FIG. 1 illustrates an example system configuration of a system in which various embodiments may be implemented. In the illustrated embodiment, one or more playback devices 100 may receive protected content from one or more content provider system(s) 110. In various embodiments, such protected content may be protected by content licenses, which may be provided by one or more license servers 120. Any of the illustrated elements may communicate over one or more networks 130, which may be configured in a manner similar to that of network 885 of FIG. 8.

In various embodiments, a given playback device 100 may be any electronic device configured to consume electronic content. Examples of such devices may include but are not limited to a computer (e.g., similar to that of computer system 800 of FIG. 8), a set top television box (with or without digital video recording capabilities), a digital television tuner, a mobile device (e.g., a smartphone) or another electronic device. While not illustrated, a given playback device 100 may include or be coupled to an electronic display (e.g., a monitor, television, or flat-panel display) configured to generate visual representations of content. Likewise, a given playback device 100 may include or be coupled to one or more transducers (e.g., an audio speaker) configured to generate audible representations of content. In any case, a given playback device 100 may be configured to generate visual and/or audible representations of content on any of the aforesaid items (e.g., displays, speakers, etc.) upon decryption of such content.

In various embodiments, a given content provider system 110 may provide to a given playback device 100 content that is structured to be linearly consumed (e.g., played). For instance, such content may include multiple encrypted content items that are to be consumed in a particular sequential order. In various embodiments, a given content item may include any cryptographically distinct portion of content described above. In one embodiment, two content items may be cryptographically distinct by virtue of being encrypted with different encryption keys. In some cases, a given encrypted content item may be a complete asset, such as a complete movie, motion picture, or television program (with or without embedded advertisements, such as television commercials). In other cases, a given encrypted content item may be a time slice (e.g., a sub-portion) of a larger program or content stream. In one particular example, the content provider system may provide to the playback device a stream of open-ended data (e.g., a 24-hour content channel) that is divided into a series of content items corresponding to time slices.

In any of these scenarios, the sequence according to which the multiple encrypted content items are to be linearly consumed may be specified by data from the content provider system 110 or some other system. In one embodiment, such data may be playlist data that specifies a sequence according to which the multiple content items are to be played. The playlist data may specify such sequence by assigning a viewing order to the multiple encrypted content items and/or by specifying distinct times at which each encrypted content item is expected to be viewed. Playback device 100 may consume the multiple encrypted content items according to the sequence described above upon decrypting the encrypted content items.

In various embodiments, the encryption of the multiple content items received by playback device 100 may serve as a conditional access control. For instance, the multiple content items may be encrypted such that only entities or devices that hold an appropriate license will be able to decrypt those content items. By controlling which entities or devices are granted such license, the content provider (or an entity acting on behalf of the content provider, such as a security provider) may enforce conditional access, entitlement(s), and/or rights on the content that it provides to playback devices. This control may be enforced by one or more license servers 120.

In various embodiments, for any of the encrypted content items received by playback device 100, the playback device may generate a license request for the license that protects that content item (e.g., the license that will enable the playback device to access the content item). The playback device 100 may send the license request to license server 120. In some cases, the identity (e.g., name or network address) of the license server to which the request should be sent may be included in manifest data (describe in more detail below with respect to FIG. 2) or a non-encrypted header portion of the encrypted content item. In some cases, the request sent to the license server may also include a license identifier that can be used by the license server to identify the appropriate license for the relevant content item of the playback device. License server 120 may identify the corresponding license and provide it to playback device 100. In some cases, the license request may also include various types of authentication information. In some cases, license server 120 may only provide the license to the playback device in response to determining that the authentication information is valid (described in more detail with respect to FIG. 2). In various embodiments, license server 120 may securely provide the license to the playback device by encrypting the license with a public key of the playback device such that only the playback device may decrypt the license by using the corresponding private key.

Playback device 100 may utilize the license received from the license server to decrypt the encrypted content item. In various embodiments, the content license may include a content decryption key that may be required to decrypt the encrypted content item. As described in more detail below, other decryption key techniques may be utilized in some embodiments (some of which employ multiple decryption keys for the same content item). In various embodiments, the content license may also include information specifying usage rules, which may in some instances be referred to as usage rights, rights, or copy control information. In various embodiments, the playback device may be configured to enforce the usage rules of the license on the access and/or consumption of the content item. In general, usage rules may include any restrictions on the use or access of the content item including but not limited to restricting the access of content to a particular time period, restricting the actions (e.g., view, copy, save, distribute, etc.) that can be performed with respect to the content item, and/or enforcing some other restriction upon the content item.

In various embodiments, the license acquisition process described above may be repeated for each content item in the linear sequence of content items consumed by the playback device. As described in more detail below, the content item may request and obtain the content license for an encrypted content item prior to the time at which that content item is expected to be played. In this way, the playback device can provide a seamless playback of the linearly consumed content items (e.g., playing the content items without temporal gaps in the playback of each content item).

By utilizing the bidirectional nature of the illustrated system, embodiments may differ from conventional unidirectional conditional access systems in a number of respects. For instance, in conventional unidirectional conditional access systems, a content provider may push decryption keys in-band (e.g., as part of a content stream) to a respective playback device. Furthermore, in conventional unidirectional conditional access systems, the content decryption keys for different playback devices (e.g., different subscribers) may all be included within the content stream; this may be done by encrypting each content decryption key such that only the appropriate playback device can decrypt it. In this conventional system, it may be left up to the individual playback devices to hold the correct key that will decrypt their respective content decryption key among the multiple other decryption keys in the content stream.

In various embodiments, the system of FIG. 1 may be implemented within a broadcast environment and the content provided from the content provider system(s) to the playback device(s) 100 may include one or more channels of content adhering to a linear programming format common within broadcasting environments. For example, in various embodiments, the various content items described herein may be content items that are delivered over such channels according to a playlist or other sequential programming schedule. In various embodiments, playback devices may be configured to access different channels of linear programming by "tuning to" (e.g., selecting) a specific channel to consume. While the embodiments may be implemented within a broadcast environment supporting linear programming, embodiments are not limited to such an environment. For instance, in some cases, the content items and licenses described herein may be acquired over a wide area network (e.g., Internet) partially or fully outside of the confines of a broadcast environment.

Figure 2:
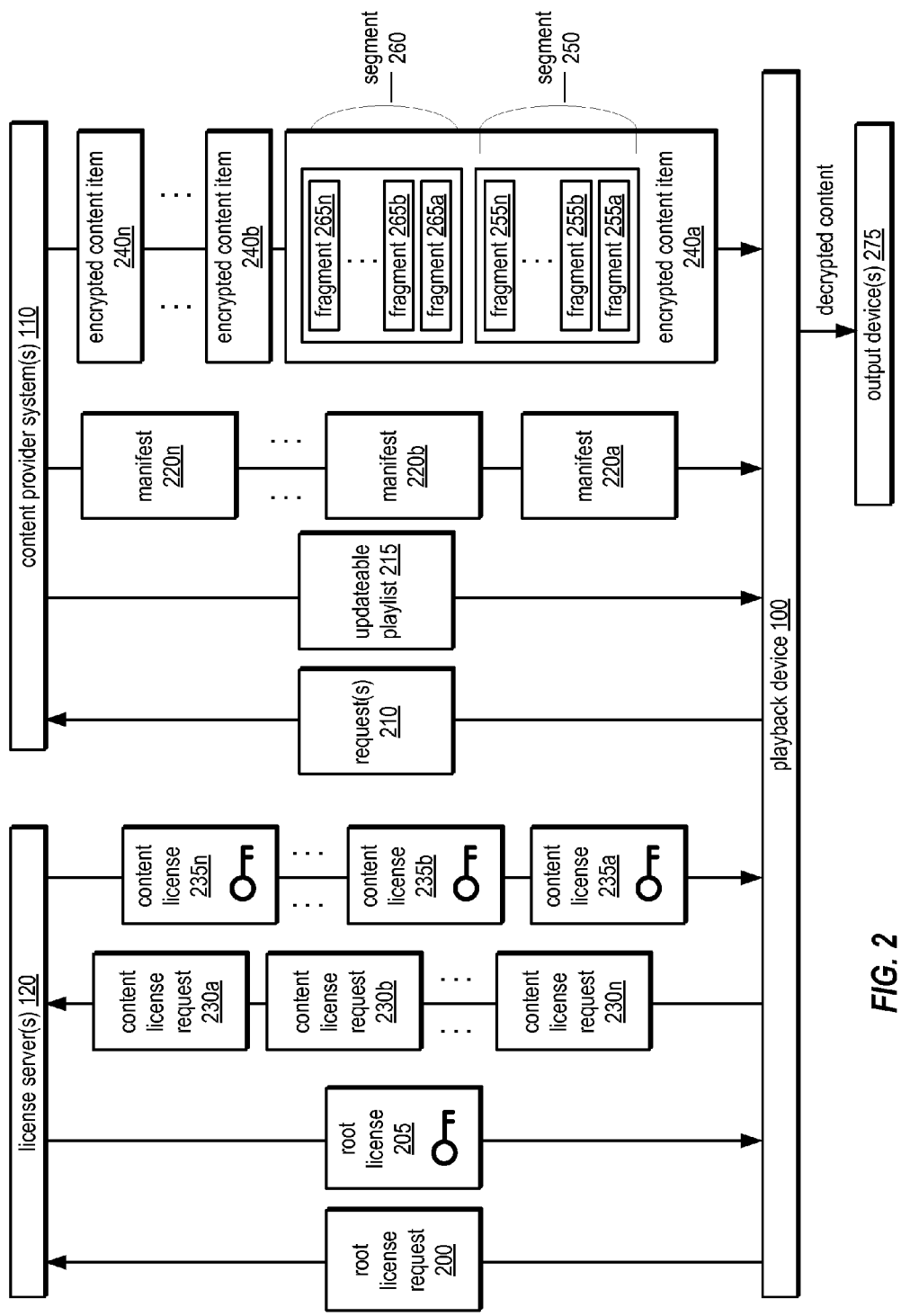
FIG. 2 illustrates an example flow diagram of license and content acquisition, according to some embodiments.

FIG. 2 illustrates an example flow diagram of the data sent and received between a given playback device 100, one or more license servers 120 and one or more content provider systems 110. Note that any of the illustrated communications may take place over one or more networks, such as network 130 described above. In the illustrated embodiment, playback device 100 may provide a root license request 200 to a license server 120. This request may include authentication information such as a subscriber identifier and/or a password or other authentication information. In response to positively validating the authentication information, license server 120 may provide root license 205 to playback device 100. In some embodiments, to validate the authentication information, the license server may ensure that the playback device (or an entity or user associated with the playback device) has a valid content subscription. In various embodiments, the root license 205 may be a long-lived license relative to the individual content licenses 235a-n described below. In one non-limiting example, the root license may be a subscription license that lasts for a one-month subscription cycle; playback device 100 may cache or store the root license locally on the playback device during that time.

As described in more detail below, the manner in which a given content item is encrypted in various embodiments may require that playback device 100 hold both a valid root license and a respective content license for that content item. For instance, root license 205 may include one decryption key and the respective content license may include a second decryption key, both of which may be required to decrypt the content item. For instance, the content item may need to be decrypted by one of such keys and then the other key in a nested manner. In other cases, one of the decryption keys may be required to decrypt the other decryption key, which may then be utilized to decrypt the content item. In other embodiments, fewer or greater quantities of licenses may be required to decrypt a given content item. In one embodiment, the root license may be valid for one or multiple content items that are to be consumed in a linear fashion. In various embodiments, each channel may include a series of encrypted content items that are to be consumed according to a particular sequence. In various embodiments, root license 205 may include a decryption key that is required to decrypt content items on the playback device.

To access a particular channel or stream of content for linear consumption, playback device may include submitting one or more requests for the content as well as for other information (e.g., playlists, manifests, etc.); these requests are illustrated as requests 210 provided by playback device 100 to one or more content provider systems 110. In response to the request(s), a content provider system 110 may provide updateable playlist 215 to playback device 100. Updateable playlist 215 may specify multiple encrypted content items (e.g., encrypted content items 240a-n) as well as the order in which such content items are to be consumed. In various embodiments, a content provider system 110 may dynamically update the playlist by providing one or more messages to playback device 100 after the initial receipt of updateable playlist 215.

While various embodiments include content that may be consumed in a linear fashion, it should be understood that this need not place any limitation on the manner in which such content is delivered to or accessed by a respective playback device 100 (nor should it place any limitation on the type of content consumed). For instance, in some cases, the content items described herein may include "on-demand" content accessed from a remote store of on-demand content. In other cases, such on-demand content may be cached locally on the playback device. In various embodiments, content that is to be consumed in a linear fashion may include disparate programs linked by the same playlist (e.g., a series of disparate sitcoms and movies). For instance, a user of playback device 100 may construct a personal playlist of different media programs (e.g., movies, television programs, music videos, etc.). This playlist of different media programs may be consumed in a linearly fashion even though each individual media program may not constitute linear content in the conventional sense.

In various embodiments, for each encrypted content item that is to be acquired by the playback device, there may be a respective manifest that specifies the internal content and/or structure of that encrypted content item. Such manifests are illustrated as manifests 220a-n. In various embodiments, the manifests may be identified by updateable playlist 215. In various embodiments, each of the manifests may be obtained prior to the time at which the corresponding encrypted content is to be played. For instance, the playback device 100 may obtain manifest 220a before encrypted content item 240a is scheduled to be consumed (e.g., according to updateable playlist 215). Manifest 220a may specify the license (e.g., via a license identifier) that is required to decrypt encrypted content items 240a. The playback device 100 may submit to a license server 120, a content license request 230a that includes the aforesaid license identifier. Content license request 230a may in some cases include authentication information for validating the playback device. Subsequent to validating the authentication information (if any), the license server may provide content license 235a to playback device 100. In addition to a content decryption key, the content license may also include one or more usage rules that are to be applied to consumption and/or access of the corresponding content item.

Playback device 100 may also request and receive the content item that corresponds to the manifest and content license. For the case of manifest 220a and content license 235a, this encrypted content item is encrypted content item 240a. In the illustrated embodiment, encrypted content item 240a is the first content item to be played according to the sequence specified by updateable playlist 215, followed by encrypted content items 240b-240n in succession.

In various embodiments, each encrypted content item may be received on playback device 100 as one or more files. For example, encrypted content item 240a may consist of multiple segments, such as segments 250 and 260. Each segment may include multiple fragments of content data. For example, in the illustrated embodiment, segment 250 includes fragments 255a-n. In one non-limiting example, each fragment may correspond to a small portion of video content (e.g., three seconds of video content or 90 video frames). In various embodiments, the structure of how each fragment and/or segment is to be constructed to form the content item as a whole may be specified by the corresponding manifest for that content item (e.g., manifest 220a). Playback device 100 may utilize the manifest to perform the reconstruction of the content item in various embodiments (e.g., to link the fragments and/or segments together at playback time).

In various embodiments, playback device 100 may utilize the decryption key of root license 205 and/or the decryption key of content license 235a to decrypt encrypted content item 240a. In one example, playback device 100 may utilize the decryption key of root license 205 to decrypt the content key from content license 235a to generate the decryption key used to decrypt encrypted content item 240a. In another example, the content item 240a may have been doubly encrypted. In such a case playback device 100 may decrypt a first level of encryption of content item 240a with the decryption key of content license 235a to generate an intermediate result, which may then be decrypted with the decryption key of root license 205 to obtain the unencrypted content item. In other cases, other decryption techniques may be utilized to decrypt encrypted content items. When utilizing the root license according to the techniques described above, the root license may be used to ensure that the playback device (or user of the playback device) holds a valid or current subscription for content. If the user's subscription were to expire or be revoked (e.g., due to failure to pay a subscription fee), the root license may be revoked or may simply expire without chance for renewal.

In various embodiments, the content license acquisition and decryption processes described above with respect to encrypted content item 240a may be repeated for encrypted content items 240b-240n. This may include receiving manifests, 220b-n, sending content license requests 230b-n, receiving content licenses 235b-n, and decrypting encrypted content items 240b-n. While not illustrated (for simplicity of illustration), encrypted content items 240b-n may include segments and fragments similar to those described with respect to encrypted content item 240a.

To support seamless content consumption (e.g., uninterrupted playback), the playback device may, for a given encrypted content item, ensure that all of the necessary information or data to decrypt that content item is retrieved before that content is to be consumed. For instance, if an encrypted content item 240 were scheduled to be consumed at a certain time but the playback device had not yet retrieved the necessary decryption keys, an interruption in the playback of updateable playlist 215's content may occur. In various embodiments, to prevent such situations, playback device 100 may retrieve the manifest and content license of a given encrypted content item well before that encrypted content item is expected to be consumed.

Each of the encrypted content items may be consumed (e.g., played) according to the sequence specified by updateable playlist 215. In some embodiments, this may include consuming the content by creating visual and/or audible representations of the decrypted content on playback device 100 (e.g., through one or more displays or speakers of playback device). In other cases, the decrypted content may be provided to one or more output devices 275. For instance, output devices 275 may include but are not limited to analog or digital displays (e.g., televisions or monitors) and/or one or more transducers (e.g., speakers). Note that while the content provided to such devices is illustrated as "decrypted content," it should be understood that this may refer to the fact that such content is based on a decrypted form of encrypted content items 240a-n; there may be other types of encryption applied to the "decrypted content" provided to output devices 275. For example, in a case where the decrypted content is provided from the playback device (e.g., a set top television box) to an output device that supports communications adhering to the High-Definition Multimedia Interface (HDMI) specification, the decrypted content provided to the output device may be encrypted in accordance with such specification. Other protocols or specifications (which may or may not include encryption) may be used to provide the decrypted content to output device(s) 275 in various embodiments.

Figure 3A:
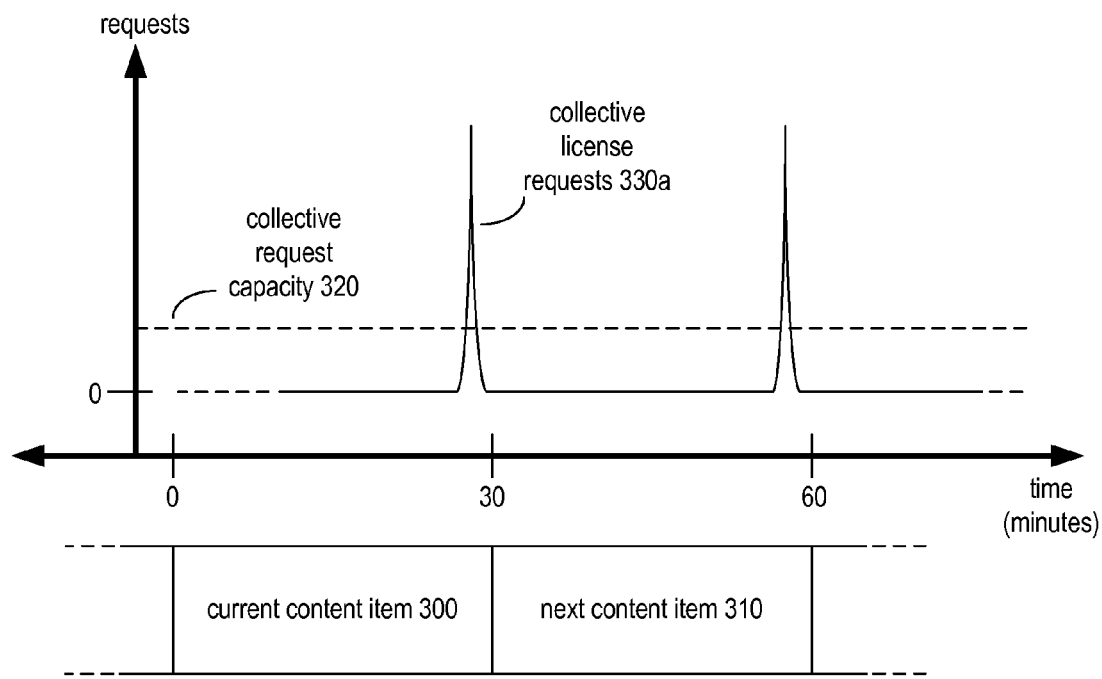
FIGS. 3A-3B illustrate an example plot of collective license requests over time, according to some embodiments.

While the illustrated embodiment of FIG. 2 illustrates a single playback device 100, it should be understood that in various embodiments, multiple playback devices may be supported in various embodiments. In these embodiments, various techniques may be utilized to ease the license request load on license server(s) 120. For example, in some cases, large quantities of playback devices may request content licenses at the same time (or within a similar time period); this may occur near the boundaries of different content items during playback. In one non-limiting example where each encrypted content items represents content that is 30:00 minutes in length, multiple playback devices may request the content license for the next encrypted content item in the playlist at or around the 29:45 mark of the current content item. (As described above, to provide seamless playback, playback devices may proactively retrieve license for a given content item before that content item is scheduled to be played.) FIG. 3A illustrates an example graph of this scenario. Below the graph of FIG. 3A, a content stream including multiple content items 300 and 310 is illustrated. In the illustrated embodiment, the collective license request capacity of the one or more license servers 120 is illustrated as collective capacity 320. Collective license requests 330a represents the request scenario described above where multiple playback devices may request the content license for the next encrypted content item in the playlist at or around the 29:45 mark of the current content item 300. As illustrated, this scenario may result one or more time periods in which the collective license requests 330a submitted by the playback devices exceed the collective request capacity 320 of one or more license servers 120.

Figure 3B:
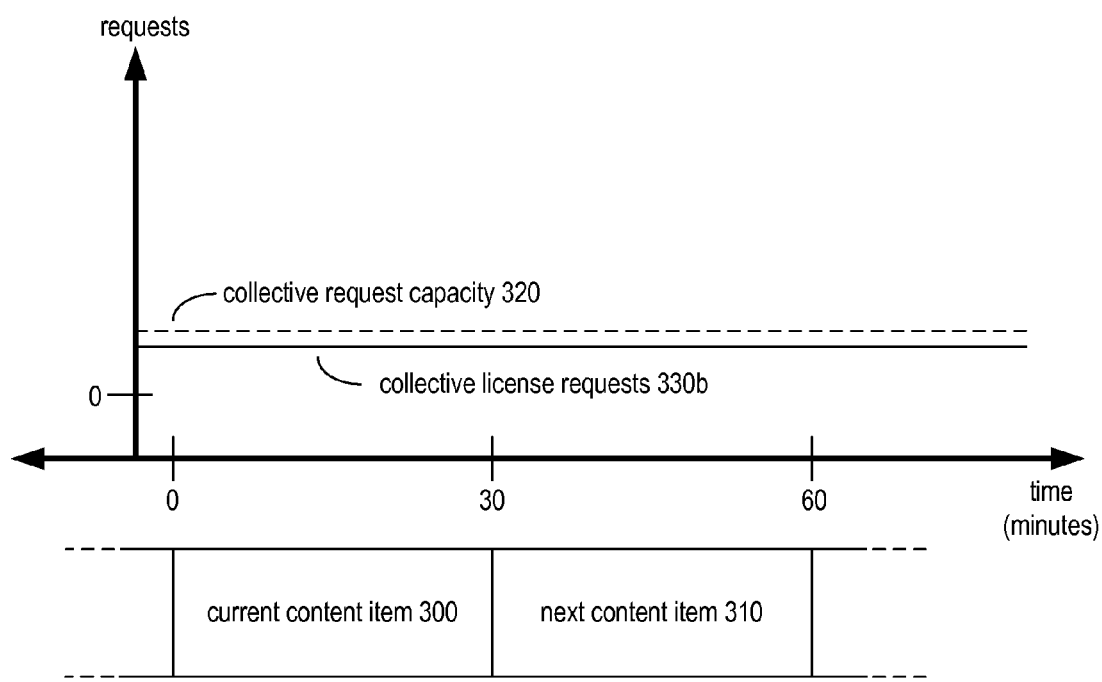

To prevent the collective license requests submitted by the playback devices 100 from exceeding the collective request capacity of the one or more license servers 120, the playback devices of various embodiments may randomly or pseudo-randomly submit a content license request for next content item 310 during the time period corresponding to current content item 300. In other cases, the submission of the content license request may be scheduled. For example, different groups of playback devices may be scheduled to submit their respective requests during respective time periods. Such schedule may in some cases be specified by license server(s) 120 or content provider system(s) 110. As illustrated in FIG. 3B, the aforesaid techniques may be utilized to bring the collective license requests below the collective request capacity 320, as illustrated by collective license requests 330b. By utilizing these techniques, embodiments may prevent the needless acquisition of addition resources (e.g., additional content license servers) by efficiently utilizing current resources (e.g., existing license servers).

In various embodiments, to reduce or minimize the number of license requests submitted by the playback devices, playback devices may, with a single request sent to license server 120, request multiple content licenses for upcoming content licenses. In response to such a request, license server 120 may provide multiple content licenses for respective upcoming requests in a given playlist. In various embodiments, while processing a multiple-license request in this manner may increase the license server's processing time per request, the overall number of requests may be reduced to a greater extent such that the license server load is less than the single license per request scenario.

In various embodiments, for the next content item in updateable playlist 215, license acquisition may occur during the consumption of the current content item, such as described with respect to FIGS. 3A-3B. A similar technique may be utilized at the time of "tuning" into a channel or playlist (e.g., when initiating consumption or playback of that channel or playlist). For instance, prior to the initial playback of the content stream corresponding to playlist 215 described above, a playback device 100 may identify the first content item (or segment or fragment) that is to be downloaded; the playback device may acquire the content license for that content item (or segment or fragment) even before that content item (or segment or fragment) is received from the content provider system.

In some embodiments, the playback devices may be configured to independently generate license identifiers such that the corresponding licenses can be acquired in parallel with playlist 215 and or manifests 220*a-n*. In other cases, the use of such deterministic license identifiers (e.g., license identifiers that can be determined independently on the playback device) may be prohibited.

In some embodiments, instead of license server 120 distributing the content licenses, the content licenses of FIG. 2 may be embedded within the respective content items of encrypted content items 240*a-n*. In these embodiments, the content decryption keys within the licenses may be encrypted by a key from the root license. Accordingly, playback device 100 may request and receive such root license from the license server. In various embodiments, the root license may be bound to the playback device (e.g., through the use of playback device's public key, such as according to the techniques of secure communication described below). The playback device may extract the appropriate decryption key from the root license, which may be shared across multiple content items (e.g., separate videos, separate segments of the same video, one or more content streams, etc.), and use such decryption key to decrypt the content decryption keys in the content licenses of those content items. The playback device may use such decryption keys to decrypt the content. Once the content is decrypted (or as the content is decrypted), the playback device may consume the content according to the techniques described above.

Figure 4:
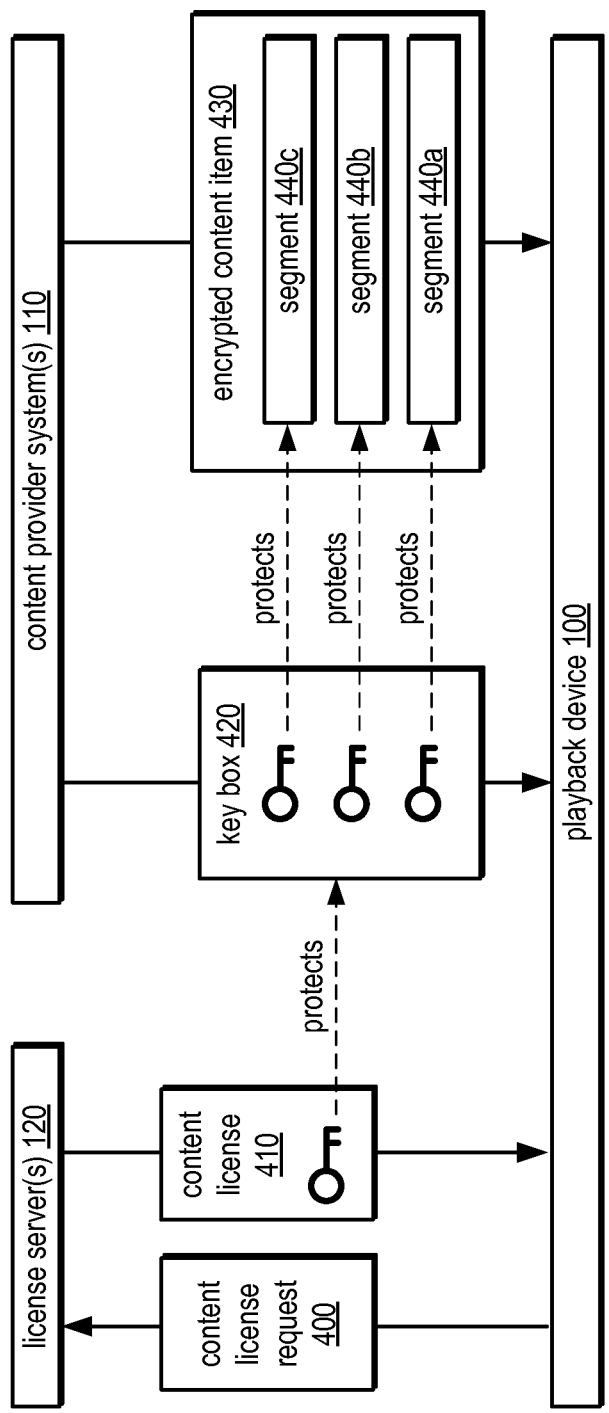
FIG. 4 illustrates an example flow diagram for key box acquisition, according to some embodiments.

In various embodiments, instead of single key utilized to protect an encrypted content item, multiple different keys may be utilized to encrypt different portions of the same encrypted content item. FIG. 4 illustrates an example flow diagram of one such embodiment. In the illustrated embodiment, playback device 100 provides a content license request 400 to license server 120; this license request may be similar to those described above. Likewise, license server 120 may handle such request in a manner similar to that described above. After authentication, license server 120 may provide content license 410 to playback device 100. Content license 410 may include usage rules and a decryption key, such as described above with respect to FIG. 2. However, in this embodiment, the decryption key may protect a key box 420 that includes multiple decryption keys, each of which may protect a corresponding one of segments 440*a-c* of the encrypted content item associated with the content license. In the illustrated embodiment, there is one decryption key in the key box for each segment of encrypted content item 430. However, in other embodiments, there may be one decryption key within the key box for each fragment (not illustrated). The key box may be provided by content provider system(s) 110 to playback device 100 within the content stream or out-of-band, according to some embodiments.

In various embodiments, playback device 100 may be configured to decrypt each segment 440*a-c* with the respective decryption key of key box 420. In some embodiments, key box 420 may specify a key identifier for each key within the key box. Likewise, each encrypted segment 440*a-c* may include metadata (e.g., header information) that specifies the identifier of the decryption key that is to be utilized to decrypt that segment. For a given segment that is to be decrypted, playback device 100 may be configured to determine that the key identifier specified by that segment's metadata matches a key identifier of a particular decryption key within key box 420. In response to that determination, playback device 100 may be configured to utilize that particular decryption key to decrypt the segment. In various embodiments, key box 420 may include an array of key identifier—decryption key pairs. In these embodiments, the playback device may be configured to compare the key identifier specified by a segment's metadata to the array of key identifier—decryption key pairs to identify the decryption key that is to be used to decrypt that content item.

In embodiments that utilize the key box techniques described above, the overall ratio of license requests to content decryption keys may be reduced relative to the embodiment of FIG. 2. For instance, in the illustrated embodiments of FIG. 2, one license request yields the use of one content decryption key. However, in the embodiment of FIG. 4, a single license yields the use of three different content decryption keys. In other words, for a given quantity of content decryption keys utilized for content, the embodiment of FIG. 4 may require license server(s) 120 to process fewer content license requests. Generally, the more decryption keys required to decrypt a given portion of content, the more secure that content will be. In various embodiments, the actual output of the decrypted content may be consumed in a manner similar to that described above with respect to FIG. 2 (e.g., generated on one or more output devices 275).

Figure 5:
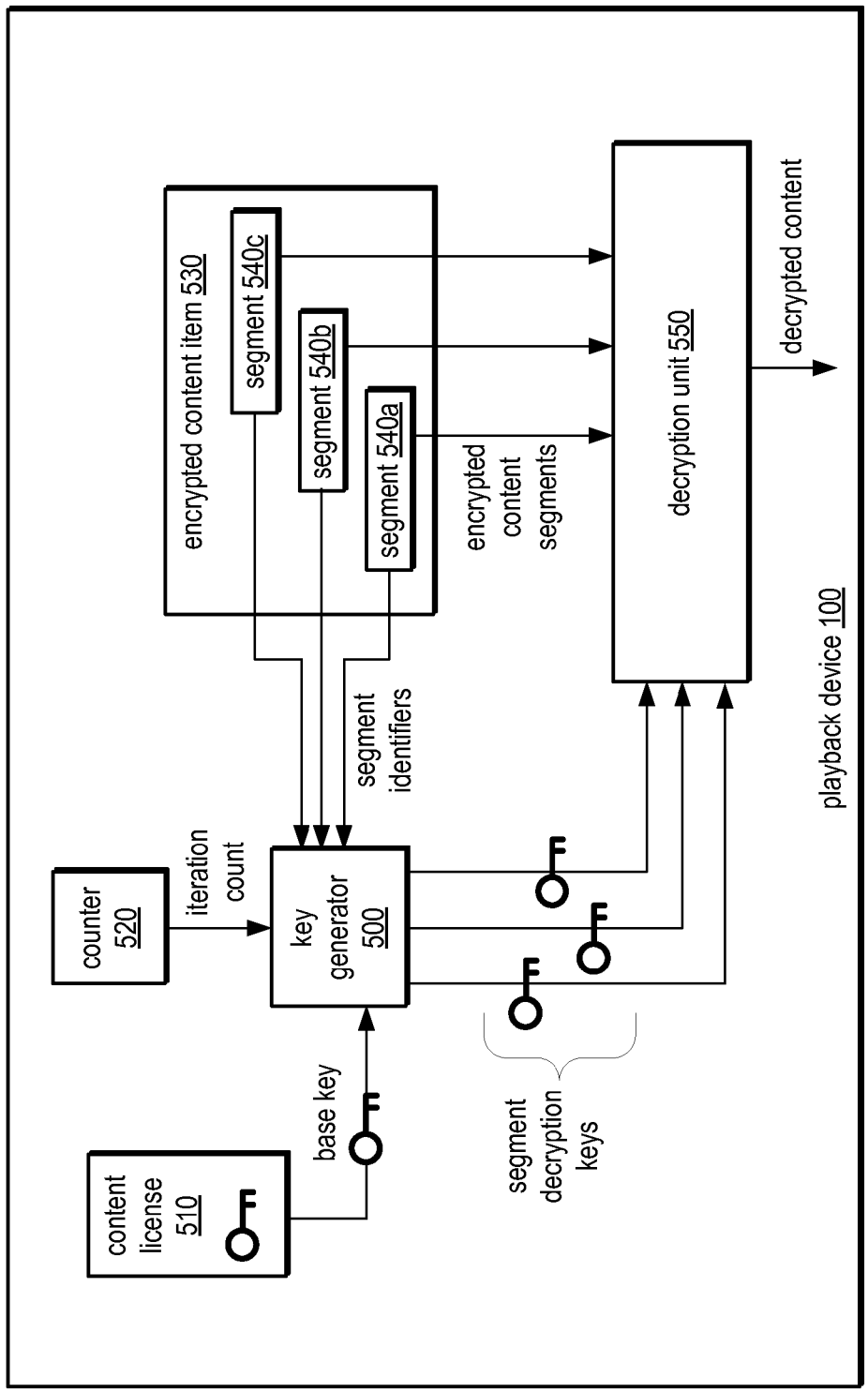
FIG. 5 illustrates an example block diagram of a playback device including a segment key generator, according to some embodiments.

In various embodiments, while different decryption keys may be utilized to decrypt different segments of the content stream, the playback device itself may generate such decryption keys; FIG. 5 illustrates an example of such an embodiment. In the illustrated embodiment, playback device 100 receives segments 540*a-c* of an encrypted content item 530. Each of the segments may include metadata that specifies a respective segment identifier that identifies that segment. As illustrated, these segment identifiers may be provided to a key generator 500, which may be configured to iteratively generate a decryption key for each segment. For instance, in some cases, segment decryption keys may be generated according to the order in which each respective segment is to be consumed.

To generate a given segment decryption key, key generator 500 may access a base decryption key from content license 510 (received from a license server 120) and an iteration count from counter 520. Key generator 500 may be configured to generate a given segment decryption key by applying a KDF to the base key, segment identifier and iteration count. In one non-limiting example, the KDF utilized may be a Public-Key Cryptography Standards (PKCS) KDF, such as the KDF utilized in PKCS #12. In some cases, utilizing the techniques described above with respect to FIG. 5 may enable keys to be changed frequently without the need for playback device 100 to receive a large key box. Avoiding the use of a very large key box may in various embodiments conserve data bandwidth and may require less memory utilization on the playback device. In various embodiments, the actual output of the decrypted content may be consumed in a manner similar to that described above with respect to FIG. 2 (e.g., generated on one or more output devices 275).

Figure 6:
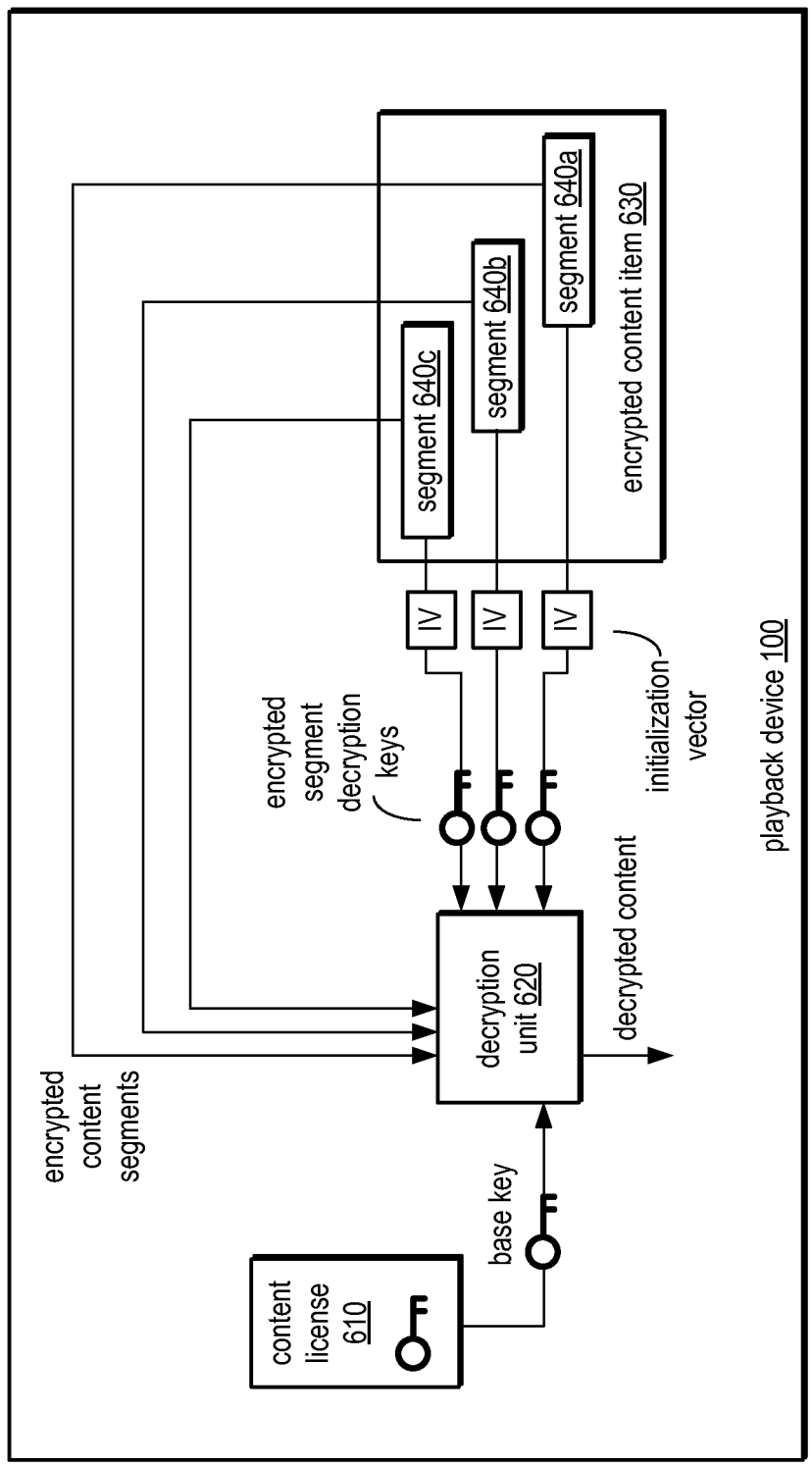
FIG. 6 illustrates an example block diagram of a playback device configured to process content including encrypted segment decryption keys, according to some embodiments.

In various embodiments, the keys utilized for decrypting the segments may be embedded (in an encrypted form) in metadata of each respective segment. FIG. 6 illustrates one such embodiment. In this embodiment, an encrypted content item 630 may include multiple encrypted segments 640a-c, each of which may be encrypted. Each segment may also include metadata (e.g., header information) that specifies an encrypted segment decryption key as well as an initialization vector (denoted as "IV") to be used during decryption of the segment decryption key. As illustrated, decryption unit 620 may access the encrypted segment decryption key and initialization vector from each segment. The decryption unit may access a base key from content license 610, which corresponds to encrypted content item 630. For a given segment, the decryption unit may utilize the base key and the initialization vector to decrypt that segment and output as decrypted content. In various embodiments, the decryption unit may utilize the Advanced Encryption Standard (AES) Cipher Algorithm in Cipher Block Chaining (CBC) Mode (AES-CBC). In one non limiting example, for a given segment to be decrypted, the decryption unit may input the base key, the initialization vector for that segment, as well as the encrypted form of the segment into AES-CBC in order to generate a decrypted representation of the segment. In various embodiments, the actual output of the decrypted content may be consumed in a manner similar to that described above with respect to FIG. 2 (e.g., generated on one or more output devices 275).

Figure 7:
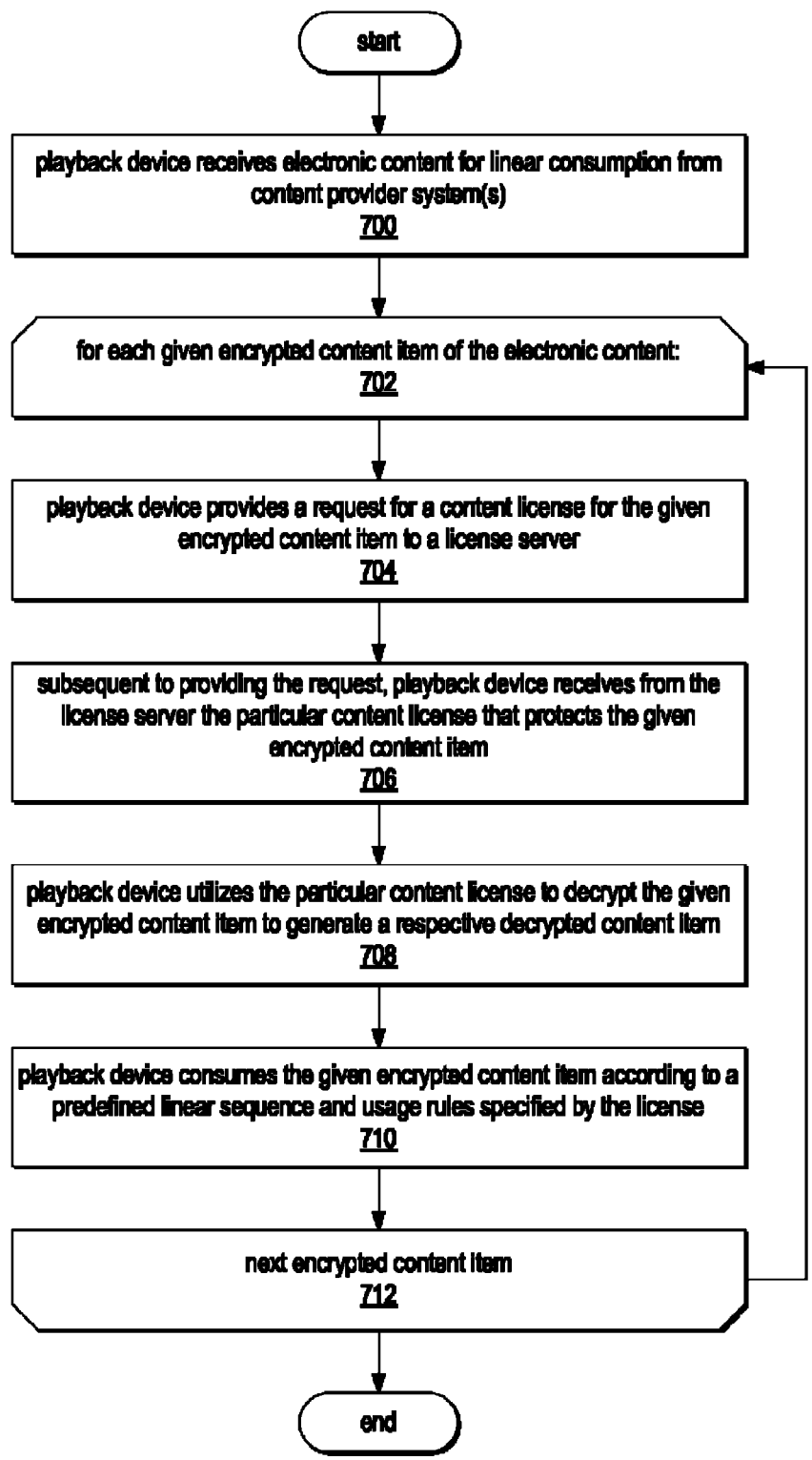
FIG. 7 illustrates a flowchart of an example method for license acquisition and content consumption, according to some embodiments.

Various embodiments may include one or more methods, an example of which is illustrated by the flowchart of FIG. 7. While the illustrated embodiment specifies particular elements (e.g., playback device, license server, content provider system, etc.) as performing various portions of the method, it should be understood that in some embodiments these portions may be performed by other elements (e.g., one or more computers or electronic devices configured in the manner of the computer of FIG. 8).

As illustrated by block 700, the method may include the playback device receiving electronic content for linear consumption from one or more content provider systems. In various embodiments, the electronic content may include multiple encrypted content items (e.g., encrypted content items 240a-n described above) that are to be consumed according to a predefined linear sequence (e.g., a sequence specified by playlist 215 described above). In various embodiments, each of the encrypted content items may be protected by a respective content license that specifies usage rules for that content item, such as the content licenses described above with respect to previous Figures.

As illustrated by blocks 702-712, blocks 704-710 may be performed for each encrypted content item of the electronic content. As illustrated by block 704, the method may include the playback device sending a request for a content license for the given encrypted content item to a license server. One example of such a request is illustrated by content license 230a described above. As illustrated by block 706, the method may include the playback device, subsequent to sending the request, receiving from the license server the particular content license that protects the given encrypted content item. One example of such receipt is described above with respect to playback device 100 receiving content license 235a. As illustrated by block 708, the method may include the playback device utilizing the particular content license received to decrypt the given encrypted content item to generate a respective decrypted content item. As illustrated by block 710, the method may also include the playback device consuming (e.g., playing) the given encrypted content item according to the predefined linear sequence (e.g., as specified by the playlist) and the usage rules specified by the received content license.

Secure Communication

In various embodiments, techniques similar to those utilized to bind a license to a component may provide secure communication between any of the elements of the illustrated framework. For instance, various elements of the illustrated framework may be associated with respective public key—private key pairs, such as key pairs utilized in Public Key Infrastructure (PKI). In the illustrated framework, a first element may securely transfer data to a second element by encrypting that data with the second element's public key. In this manner, only the second element will be able to decrypt the encrypted data to access the unencrypted data, according to various embodiments. For instance, since in various embodiments knowledge of the private key may be required to decrypt the data and since the second element may be the only element that has knowledge of its own private key, the second element may be the only element able to decrypt the data with the correct private key. Note that the aforesaid techniques may in various embodiments be utilized for any transfer of data within the system of FIG. 2. One example includes the "binding" of root license 205 to playback device 100. Another example might include license server 120 securely sending a content license 235a-n to playback device 100. For example, license server 120 might obtain a public key for the playback device 100 and encrypt the license with that public key prior to transferring the license to the playback device. In this example, only playback device 100 will be able to decrypt the license (since the playback device may be the only element with knowledge of the correct private key). In some embodiments, a given element may trust another element with knowledge of its private key (thereby allowing the other element to decrypt data encrypted with the given element's public key). For example, playback device 100 might be a computer that shares its private key with a mobile device (e.g., personal media player or smartphone) with which it syncs data. In some embodiments, the license may be bound to multiple public keys, such as public keys of multiple electronic devices (e.g., laptop, mobile phone, etc.); in this case, the sharing of the private key may be unnecessary. In various embodiments, the public keys described herein may be obtained from a public key certificate, such as a certificate provided by a certificate authority (not illustrated) in PKIs. One example of such a certificate is an X.509 certificate (in other cases, other types of public key certificates may be utilized).

Example Computer System

Various embodiments of a system and method for providing content protection of linearly consumed content with a bidirectional protocol for license acquisition, as described herein, may be executed on one or more computer systems, which may interact with various other devices. One such computer system is computer system 800 illustrated by FIG. 8, which may in various embodiments implement any of the systems, devices, elements or methods illustrated in FIGS. 1-7. For instance, any of the functionality described above may be stored in memory as processor-executable executable program instructions 822 (e.g., program instructions executable by processor(s) 810). In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x96, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, program instructions 822 may be executable by the processor(s) to implement the functionality of any content provider system, playback device, or license server described above. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the framework described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the computer system, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 885), such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the methods described above, such as the method illustrated by FIG. 7. In other embodiments, different elements and data may be included.

Those skilled in the art will appreciate that computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, set top television boxes, pagers, and/or any other electronic device described herein. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method comprising:
receiving, at a playback device, an updateable playlist for electronic content, the updateable playlist specifying multiple electronic content items and a linear sequence in which the multiple electronic content items are to be consumed, the electronic content comprising multiple encrypted content items, each encrypted content item being protected by a corresponding license specifying usage rules for the encrypted content item;
receiving a manifest, identified by the updateable playlist, corresponding to one of the encrypted content items, the manifest specifying the internal content and structure of the corresponding encrypted content item, and an identity of the corresponding license required to decrypt the encrypted content item;
receiving, at the playback device, the electronic content for linear consumption; and
for each encrypted content item of at least some of the encrypted content items of the electronic content:
providing, from the playback device, a request for the corresponding license for the encrypted content item to a remote computer;
responsive to the request, receiving the corresponding license that protects the encrypted content item, separate from the encrypted content item;
utilizing the corresponding license to decrypt the encrypted content item to generate a respective decrypted content item;
consuming the decrypted content item according to said linear sequence and said usage rules; and
providing, from the playback device, at a selected time during the consumption of a current encrypted content item, a request to the remote computer for the license that protects a next encrypted content item, the next encrypted content item being a content item that is to be consumed after the current encrypted content item according to said linear sequence and for at least one encrypted content item, the corresponding license that protects that encrypted content item is received before the receipt of that encrypted content item.

2. The computer-implemented method of claim 1, wherein said remote computer is a license server within a broadcast environment and said electronic content for linear consumption is received from a content provider system within the broadcast environment.

3. The computer-implemented method of claim 1, wherein the corresponding license comprises a decryption key for decrypting the encrypted content item, the decrypting of the encrypted content item comprising decrypting the encrypted content item with the decryption key.

4. The computer-implemented method of claim 3, wherein at least one of the corresponding licenses is a root license comprising a root decryption key for decrypting decryption keys corresponding to multiple content items of the electronic content.

5. The computer-implemented method of claim 4, wherein the root license corresponds to a valid content subscription for the electronic content.

6. The computer-implemented method of claim 1, wherein the method comprises randomly selecting the selected time from a period of time during which the current encrypted content item is scheduled to be consumed.

7. The computer-implemented method of claim 1, wherein responsive to at least one of the requests for the corresponding license being a request for multiple licenses corresponding to multiple encrypted content items that have not yet been consumed, receiving multiple licenses corresponding to the multiple encrypted content items that have not yet been consumed.

8. The computer-implemented method of claim 1, wherein an encrypted content item includes multiple segments, each segment specifying an encrypted decryption key for decrypting that segment; the method comprising, responsive to decrypting the encrypted decryption key of each segment with a cryptographic key from the license received for the encrypted content item, decrypting each segment of the encrypted content item with the respective decryption key that was decrypted.

9. A system comprising:
one or more processors; and
memory coupled to the one or more processors, the memory comprising instructions executable by the one or more processors to:
receive, at a playback device, an updateable playlist for electronic content, the updateable playlist specifying multiple electronic content items and a linear sequence in which the multiple electronic content items are to be consumed, the electronic content comprising multiple encrypted content items, each encrypted content item being protected by a corresponding license specifying usage rules for the encrypted content item;

receive a manifest, identified by the updateable playlist, corresponding to one of the encrypted content items, the manifest specifying the internal content and structure of the corresponding encrypted content item, and an identity of the corresponding license required to decrypt the encrypted content item;

receive, at the playback device, the electronic content for linear consumption; and for each encrypted content item of at least some of the encrypted content items of the electronic content:

provide, from the playback device, a request for the corresponding license for the encrypted content item to a remote computer;

responsive to the request, receive the corresponding license that protects the encrypted content item license separate from the encrypted content item and for at least one encrypted content item, the corresponding license that protects that encrypted content item is received before the receipt of that encrypted content item;

utilize that corresponding license to decrypt the encrypted content item to generate a respective decrypted content item, in which an encrypted content item includes multiple segments, each segment specifying an encrypted decryption key for decrypting that segment and responsive to decrypting the encrypted decryption key of each segment with a cryptographic key from the license received for the encrypted content item, decrypting each segment of the encrypted content item with the respective decryption key that was decrypted; and consume the decrypted content item according to said linear sequence and said usage rules.

10. The system of claim 9, wherein said remote computer is a license server within a broadcast environment and said electronic content for linear consumption is received from a content provider system within the broadcast environment.

11. The system of claim 9, wherein the corresponding license comprises a decryption key for decrypting the encrypted content item, the instructions executable to decrypt the encrypted content item with the decryption key.

12. The system of claim 11, wherein at least one of the corresponding licenses is a root license comprising a root decryption key for decrypting decryption keys corresponding to multiple content items of the electronic content.

13. The system of claim 12, wherein the root license corresponds to a valid content subscription for the electronic content.

14. The system of claim 9, wherein the instructions are executable to provide, from the playback device to the remote computer, at a selected time during the consumption of a current encrypted content item a request for the license that protects a next encrypted content item, the next encrypted content item being a content item that is to be consumed after the current encrypted content item according to said linear sequence.

15. The system of claim 14, wherein the instructions are executable to randomly select the selected time from a period of time during which the current encrypted content item is scheduled to be consumed.

16. The system of claim 9, wherein responsive to at least one of the requests for the corresponding license being a request for multiple licenses corresponding to multiple encrypted content items that have not yet been consumed, the instructions being executable to receive multiple licenses corresponding to the multiple encrypted content items that have not yet been consumed.

17. A computer-implemented method comprising:

receiving, at a playback device, an updateable playlist for electronic content, the updateable playlist specifying multiple electronic content items and a linear sequence in which the multiple electronic content items are to be consumed, the electronic content comprising multiple encrypted content items, each encrypted content item being protected by a corresponding license specifying usage rules for the encrypted content item;

receiving a manifest, identified by the updateable playlist, corresponding to one of the encrypted content items, the manifest specifying the internal content and structure of the corresponding encrypted content item, and an identity of the corresponding license required to decrypt the encrypted content item;

receiving, at the playback device, the electronic content for linear consumption; and for each encrypted content item of at least some of the encrypted content items of the electronic content:

providing, from the playback device, a request for the corresponding license for the encrypted content item to a remote computer;

responsive to the request, receiving the corresponding license that protects the encrypted content item, separate from the encrypted content item;

utilizing the corresponding license to decrypt the encrypted content item to generate a respective decrypted content item, in which an encrypted content item includes multiple segments, each segment specifying an encrypted decryption key for decrypting that segment and responsive to decrypting the encrypted decryption key of each segment with a cryptographic key from the license received for the encrypted content item, decrypting each segment of the encrypted content item with the respective decryption key that was decrypted; and consuming the decrypted content item according to said linear sequence and said usage rules; and providing, from the playback device, at a selected time during the consumption of a current encrypted content item, a request to the remote computer for the license that protects a next encrypted content item, the next encrypted content item being a content item that is to be consumed after the current encrypted content item according to said linear sequence and for at least one encrypted content item, the corresponding license that protects that encrypted content item is received before the receipt of that encrypted content item.

18. The computer-implemented method of claim 17, wherein said remote computer is a license server within a broadcast environment and said electronic content for linear consumption is received from a content provider system within the broadcast environment.

19. The computer-implemented method of claim 17, wherein the corresponding license comprises a decryption key for decrypting the encrypted content item, the decrypting of the encrypted content item comprising decrypting the encrypted content item with the decryption key.

20. The computer-implemented method of claim 19, wherein at least one of the corresponding licenses is a root license comprising a root decryption key for decrypting decryption keys corresponding to multiple content items of the electronic content.

21. The computer-implemented method of claim 20, wherein the root license corresponds to a valid content subscription for the electronic content.

22. The computer-implemented method of claim 17, wherein the method comprises randomly selecting the selected time from a period of time during which the current encrypted content item is scheduled to be consumed.

23. The computer-implemented method of claim 17, wherein responsive to at least one of the requests for the corresponding license being a request for multiple licenses corresponding to multiple encrypted content items that have not yet been consumed, receiving multiple licenses corresponding to the multiple encrypted content items that have not yet been consumed.

24. The computer-implemented method of claim 17, wherein for at least one encrypted content item, the method comprises receiving the corresponding license that protects that encrypted content item before the receipt of that encrypted content item.

\* \* \* \* \*